April 18, 1961  J. F. STEEL  2,980,567
LOUVERED SCREEN AND METHOD OF MAKING THE SAME
Filed June 6, 1958  2 Sheets-Sheet 1

INVENTOR.
JOHN F. STEEL
BY
Attorneys

April 18, 1961    J. F. STEEL    2,980,567
LOUVERED SCREEN AND METHOD OF MAKING THE SAME
Filed June 6, 1958    2 Sheets-Sheet 2
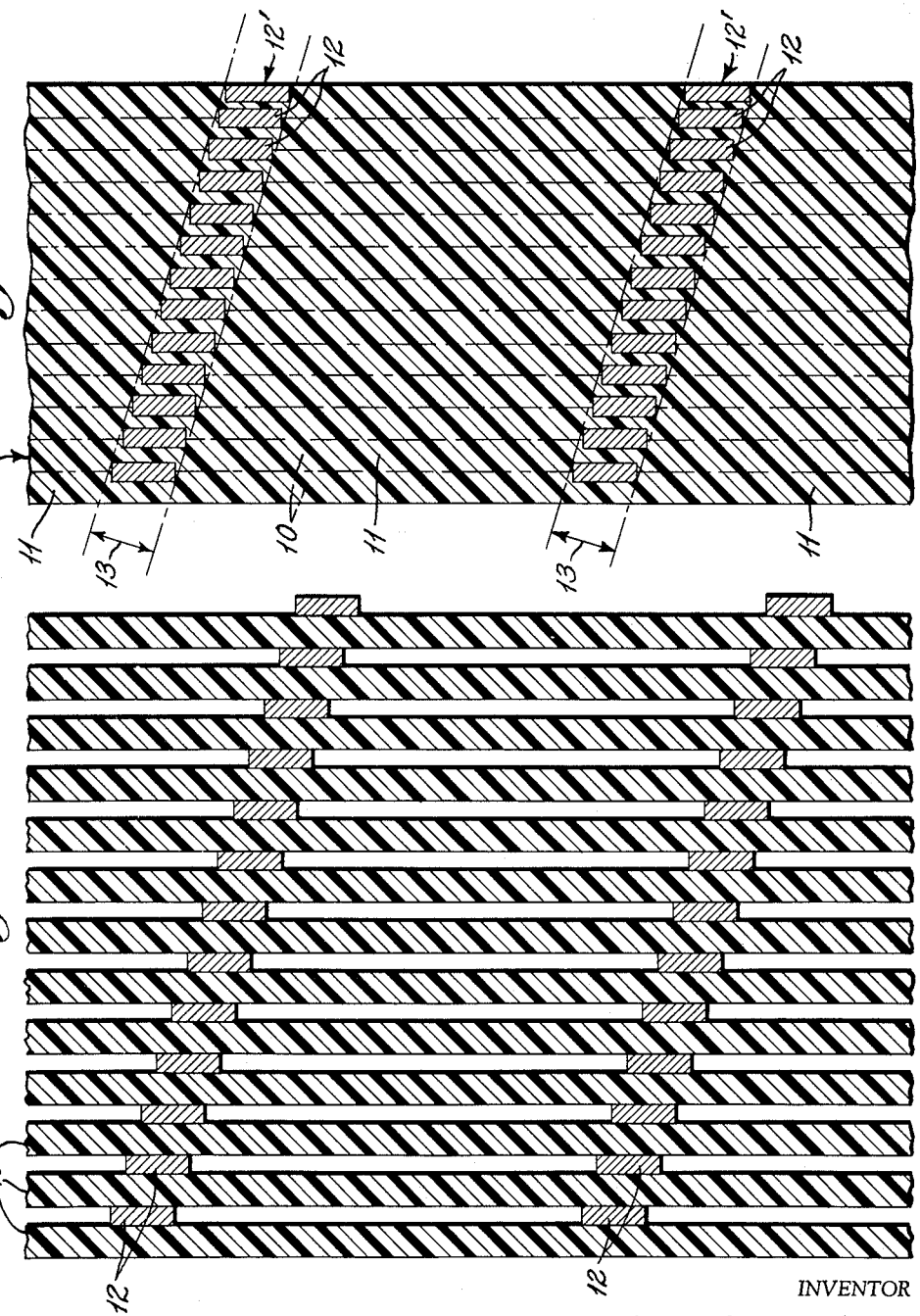
INVENTOR
John F. Steel
BY Hulwider, Mattingly & Huntley
ATTORNEYS United States Patent Office 2,980,567
Patented Apr. 18, 1961

2,980,567

LOUVERED SCREEN AND METHOD OF MAKING THE SAME

John F. Steel, Hollywood, Calif.
(133 S. Bedford Drive, Beverly Hills, Calif.)

Filed June 6, 1958, Ser. No. 740,305

12 Claims. (Cl. 154—2.65)

This invention relates to sun reflectors, and more particularly to a method and apparatus providing an improved louvered screen to reflect the sun's rays from a window without affecting visibility.

Louvered screens of the prior art take the form of horizontal metal louvers supported between metal uprights or mullions. The mullions are essential to hold the louvers fixed in a horizontal position. Such screens are effective to reflect the sun's rays, but they are impractical to use.

If a metal sun screen is placed adjacent a window, it rapidly accumulates dirt which impairs or blocks visibility. The louvers and mullions are quite thin, so that they are easily bent and broken when they are cleaned. If such a screen is suspended between two spaced sheets of glass to form a window, condensation occurs between the sheets to impair visibility.

If such a screen is placed between and bonded to two sheets of glass, there is no problem of condensation. However, there is a wide variance between the coefficients of expansion and contraction of the metal screen and the glass. On a very cold day, for example, the contraction of the metal screen is sufficient, compared to the relatively small contraction of the glass, to cause the glass to shatter.

An additional disadvantage of the prior art metal screens resides in the mullions which support the louvers. These mullions must be fairly closely spaced, e.g., one inch apart, in order that the thin louvers will remain horizontal. However, the number of mullions impairs visibility. Although the louvers are disposed at an angle, e.g., 17°, for optimum visibility and reflection, the mullions present to the eye a number of opaque vertical strips across a person's view. This arrangement is annoying to one looking through such a window structure, and places severe limitations on architects in their attempts to make attractive window designs.

Because of these various objections to metal louvered screens, attempts have been made to form louvers in glass or transparent plastic sheets. Generally, such efforts are directed to forming a glass panel with parallel grooves in one surface thereof, or sawing parallel grooves in one surface of a plastic sheet, and then depositing an opaque material in such grooves to provide the desired louver effect. Since grooves are formed in a panel for this purpose, the depth thereof must be restricted, in order that an unduly weak panel will not result. Great pains must be taken to produce such structures, which are often broken or marred in manufacture. Accordingly, they are extremely difficult, time-consuming and costly to produce.

It is an object of this invention to provide a method and apparatus for a louvered sun screen, in which reflective louvers extend completely through the thickness of a transparent sheet, and yet are fixed in position by said sheet.

Another object of this invention is to provide a method of forming louvers in a transparent panel with a minimum of operations and at extremely low cost.

It is a further object of this invention to provide a plastic panel having louvers of a width equal to the thickness of the panel, and which obviates costly steps heretofore followed for forming and filling grooves of such a panel with opaque material.

A further object of this invention is to provide an improved window structure in which a transparent sheet contains louvers of a width coextensive with the thickness thereof, such sheet being bonded to two sheets of glass to form a window which is free of the problems of condensation and of expansion and contraction inherent in prior art louvered windows.

Still another object of this invention is to provide a plastic sheet containing respective parallel rows of opaque material each forming a composite louver for reflecting the sun's rays.

Yet a further object of this invention is to provide a method of combining a plurality of transparent sheets having opaque lines thereon to form a transparent panel with louvers oriented at a desired angle to reflect sunlight.

The above and other objects and advantages of this invention will become apparent from the following description taken in conjunction with the accompanying drawing illustrating a preferred embodiment thereof and method of making the same, and in which:

Figure 4 is an enlarged fragmentary side elevation view of the arrangement of the sheets prior to subjecting them to heat and pressure;

Figure 6 is an enlarged, fragmentary side elevation view of the composite sheet, showing the disposition of respective opaque lines to form louvers.

Figure 1:
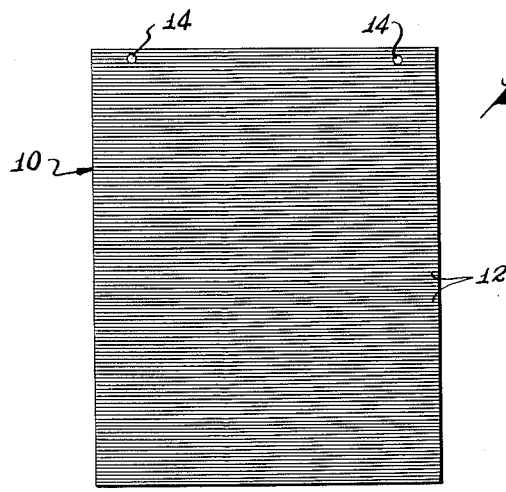
Figure 1 is a plan view of a transparent sheet of plastic material having parallel lines of opaque material printed thereon, and showing guide holes for mounting the sheet with others so as to form a composite transparent sheet with built-in louvers.
Figure 2:
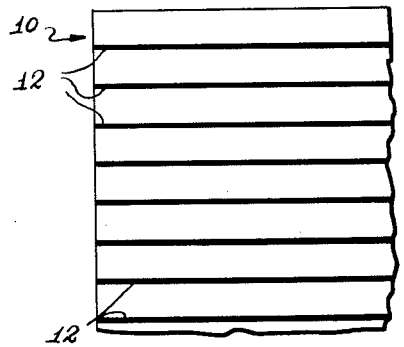
Figure 2 is an enlarged, fragmentary view of the front of the sheet of Figure 1, illustrating the thickness and spacing of the lines.
Figure 3:
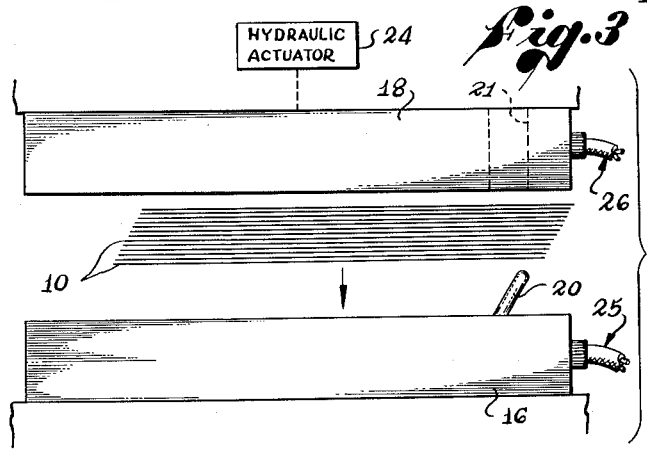
Figure 3 is an elevation view of a pair of spaced platens, showing how a plurality of the transparent sheets are positioned prior to forming the composite sheet.

Referring to Figures 1 and 2, a thin sheet 10 of transparent material, which preferably is a plastic material suitable to be bonded to glass, e.g., butyrate or butycite, or other suitable synthetic resinous material, has a plurality of parallel lines 12 printed thereon. The lines 12 are formed of an opaque material, such as aluminum paint. However, it will become apparent that, for artistic purposes, the lines may be formed of other opaque materials, e.g., heat-resistant inks which are colored.

The sheet 10 is quite thin, e.g., 0.005" thick. The width of the lines 12 is equal to the thickness of a louver, e.g., 0.010", and the spacing between them corresponds to a desired louver separation, e.g., 0.062". The lines may be printed on the sheet in any well known manner, e.g., by use of the silk-screen process, stenciling process, contact printing, etc.

Referring to Figures 3–6 along with Figure 1, a plurality of sheets 10 of the same size, with the same number of lines thereon, are each provided with spaced openings or guide holes 14 (see Figure 1) adjacent one edge thereof. A number of these sheets (see Figure 3) are placed together between the platens 16, 18 of a press apparatus. In one example, thirteen sheets of 0.005" thickness were used to form an effective sun screen. The lower platen 16 is provided with spaced guide pins 20 which project from the face of the platen 16 at a desired angle (e.g., 17°) from the vertical, for receiving the openings 14. Spaced openings 21 are provided in the upper platen, into which the guide pins 20 extend when the platens are closed together.

Figure 5:
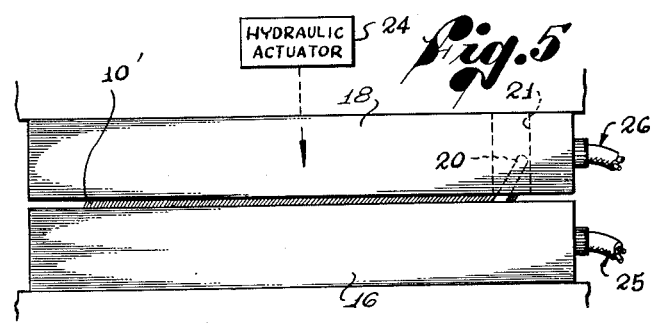
Figure 5 is an elevation view, similar to Figure 3, showing the platens in position for forming the separate sheets into a composite sheet.

As shown in Figure 5, the guide pins 20 cause the sheets of the stack to be displaced horizontally relative to each other, whereby the lines 12 on the sheets are similarly displaced. This results in corresponding lines 12 on all the sheets being disposed in a plane which forms the same angle with the vertical as the guide pins 20.

Since the sheets 10 are so thin, the thickness of the material forming a line 12 thereon is very little, less than the sheet, and may be of the order of 0.002"–0.003" thickness.

After the sheets are assembled on the guide pins 20 as above described, the platens 16, 18 are closed (see Figure 5). The platens may be closed under hydraulic pressure, as indicated at 24, or by other suitable means. Preferably they are also heated, as by heater coils 25, 26. The stacked sheets 10 are thus heated under pressure, as at 300° F., under a pressure of 200 pounds per square inch, to cause the plastic material of each sheet to flow sufficiently so as to be bonded with adjacent sheets.

This bonding process results in a single transparent sheet 10' (see Figure 5) being formed of the lamina or sheets 10. Accordingly, the lines 12, which formerly were supported on an individual sheet 10, are now embedded in the resultant single sheet 10' (see Figure 6).

Since corresponding lines 12 are closely spaced in the composite sheet 10', they appear to the eye as a continuous louver. Thus, and as illustrated in Figure 5, the sheet 10' effectively has louvers 12' formed therein, the widths of which are equal to the thickness of the sheet 10'.

With reference to Figure 6, each of the louvers 12' is slat shaped in cross section, i.e., has the configuration of a relatively long narrow bar such as a slat of a conventional Venetian blind. The sides 13 of each louver extend transversely across the plane of the sheet 10' substantially from face-to-face of the sheet. The width of the louver is substantially equal to the thickness of the sheet 10'. Since the sides of the louvers are defined by the edges of the lines or strips 12, the thickness of each louver is equal to the width of each of the strips 12. The opposed sides of adjacent louvers 12' define transparent passages 11 through the sheet 10' between the louvers. Thus, light may freely pass through the sheet 10' in a direction parallel to the louvers through the passages 11.

Figure 7:
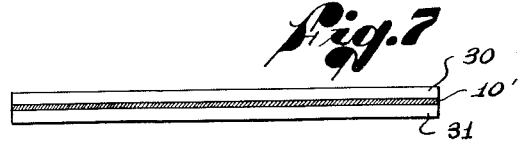
Figure 7 is a side elevation view of a window in which the composite sheet is bonded to two sheets of glass.

A window is constructed by bonding the sheet 10' between a pair of glass panels 30, 31 (see Figure 7), which may be done by conventional means employed for forming safety glass, e.g., a combination of heat and pressure, or by coating the sheets with a bonding agent and effecting a bond under pressure.

With the sheet 10' disposed vertically, the width of each individual line 12 is sufficient that sunlight does not pass between the lines, but is reflected from them. The effect is that of a louver of uninterrupted width. Thus, each of the louvers because of the width and close spacing of the strips 12 is substantially opaque over its entire width to the passage of light through the sheet 10' along lines so inclined relative to the passages 11 that such lines intersect one or more louvers.

The process of making the louvered sun screen of this invention is extremely simple and inexpensive. The sheet 10' can be formed for a fraction of the cost of conventional metal sun screens, and since it can be readily bonded between sheets of glass, it provides a sun screen window having no problems relating to accumulation of dust, condensation or expansion and contraction.

A sun screen window formed in accordance with this invention can readily be cut to desired sizes, as with conventional safety glass. Since there are no mullions, an architect can design combinations of windows which heretofore were not aesthetically proper because of these distracting components. Further, the louvers can be made of tinted opaque materials, thus giving the architect an even greater range of design choice.

It will be recognized that my basic process is applicable to the formation of plastic products other than louvered screens, and is useful wherever it is desired to have lines extending through the thickness of a plastic part.

While the embodiment of my invention herein shown and described illustrates the advantages of my invention, it will be understood that many modifications can be made thereto without departing from the scope thereof. Therefore, I do not intend to be limited to the particular embodiment herein described, except as defined in the appended claims.

I claim:

1. A louvered screen comprising a transparent sheet of synthetic resinous material and a plurality of spaced parallel louvers embedded in said sheet, said louvers being slat shaped with their sides extending across the plane of said sheet leaving transparent passages through said sheet between said louvers, each of said louvers being composed of a substantial number of strips of opaque material disposed parallel to the plane of said sheet and closely spaced from each other across the entire width of the louver, the sides of said slat shaped louvers being defined by the edges of said strips, each of said louvers because of the width and close spacing of said strips being substantially opaque over its entire width to the passage of light through said sheet along lines inclined relative to said passages so as to intersect said louver.

2. A louvered screen, as recited in claim 1, wherein each louver has its adjacent strips laterally offset relative to each other so that the louver is inclined relative to the face of said sheet.

3. A louvered screen comprising a composite transparent sheet of synthetic resinous material, said sheet comprising a substantial number of fused parallel layers of such material and a plurality of spaced parallel louvers embedded in said composite sheet, said louvers being slat shaped with their sides extending across the plane of said sheet leaving transparent passages through said sheet between said louvers, each of said louvers being composed of a substantial number of strips of opaque material disposed in said fused layers parallel to the plane of said sheet and closely spaced from each other across the entire width of the louver, the sides of said slat shaped louvers being defined by the edges of said strips, each of said louvers because of the width and close spacing of said strips being substantially opaque over its entire width to the passage of light through said sheet along lines inclined relative to said passages so as to intersect the louver.

4. A louvered screen, as recited in claim 3, wherein each louver has its adjacent strips laterally offset relative to each other so that the louver is inclined relative to the faces of said composite sheet.

5. A window comprising two panels of glass and a louvered screen positioned between said panels and bonded thereto, said louvered screen comprising a transparent sheet of synthetic resinous material and a plurality of spaced parallel louvers embedded in said sheet, said louvers being slat shaped with their sides extending across the plane of said sheet leaving transparent passages through said sheet between said louvers, each of said louvers being composed of a substantial number of strips of opaque material disposed parallel to the plane of said sheet and closely spaced from each other across the entire width of the louver, the sides of said slat shaped louvers being defined by the edges of said strips, each of said louvers because of the width and close spacing of said strips being substantially opaque over its entire width to the passage of light through said sheet along lines inclined relative to said passages so as to intersect said louver.

6. A window comprising two panels of glass and a louvered screen between said panels and bonded thereto, said louvered screen comprising a composite transparent sheet of synthetic resinous material, said sheet comprising a substantial number of fused parallel layers of such material and a plurality of spaced parallel louvers embedded in said composite sheet, said louvers being slat shaped with their sides extending across the plane of said sheet leaving transparent passages through said sheet between said louvers, each of said louvers being composed of a substantial number of strips of opaque material disposed in said layers parallel to the plane of said sheet and closely spaced from each other across the entire width of the louver, the sides of said slat shaped louvers being defined by the edges of said strips, each of said louvers because of the width and close spacing of said strips being substantially opaque over its entire width to the passage of light through said sheet along lines inclined relative to said passages so as to intersect the louver.

7. The method of forming a louvered screen comprising placing parallel strips of opaque material on each of a substantial number of thin transparent sheets of synthetic resinous material, stacking said sheets in face-to-face contact and securing said sheets together with corresponding strips on the sheets disposed closely spaced apart in rows in parallel planes with said rows forming slat shaped louvers with their sides extending across the plane of said sheets, the sides of said louvers being defined by the edges of said strips, each of said louvers because of the width and close spacing of said strips being substantially opaque over its entire width to the passage of light through said sheet along lines inclined relative to said passages so as to intersect the louver.

8. The method as recited in claim 7 wherein said sheets are stacked with the strips in each row offset relative to each other so that the resulting louver is inclined relative to the face of the stack of sheets.

9. The method of forming a louvered screen comprising placing parallel strips of opaque material on each of a substantial number of thin transparent sheets of synthetic resinous material, stacking said sheets in face-to-face contact and bonding said sheets together by applying heat and pressure thereto with corresponding strips on the sheets disposed closely spaced apart in rows in parallel planes with said rows forming slat shaped louvers with their sides extending across the plane of the sheets, the sides of said louvers being defined by the edges of said strips, each of said louvers because of the width and close spacing of said strips being substantially opaque over its entire width to the passage of light through said sheet along lines inclined relative to said passages so as to intersect the louver.

10. The method, as recited in claim 9, wherein said sheets are stacked with the strips in each row laterally offset relative to each other so that the resulting louver is inclined relative to the faces of said sheets.

11. The method of forming a window comprising placing parallel strips of opaque material on each of a substantial number of thin transparent sheets of synthetic resinous material, stacking said sheets in face-to-face contact and securing said sheets together with corresponding strips on the sheet disposed closely spaced apart in rows in parallel planes with said rows forming slat shaped louvers with their sides extending across the plane of said sheets, the sides of said louvers being defined by the edges of said strips, each of said louvers because of the width and close spacing of said strips being substantially opaque over its entire width to the passage of light through said sheet along lines inclined relative to said passages so as to intersect the louver, placing said stack of sheets between two panels of glass and securing said stack of sheets to said panels.

12. The method of forming a window comprising placing parallel strips of opaque material on each of a substantial number of thin transparent sheets of synthetic resinous material, stacking said sheets in face-to-face contact and bonding said sheets together by applying heat and pressure thereto with corresponding strips on the sheets disposed closely spaced apart in rows in parallel planes with said rows forming slat shaped louvers with their sides extending across the plane of said sheets, the sides of said louvers being defined by the edges of said strips, each of said louvers because of the width and close spacing of said strips being substantially opaque over its entire width to the passage of light through said sheet along lines inclined relative to said passages so as to intersect the louver, placing said stack of sheets between two panels of glass and bonding said stack of sheets to said panels.

References Cited in the file of this patent

UNITED STATES PATENTS

| | | |
|---|---|---|
| 1,268,145 | Pease | June 4, 1918 |
| 2,009,167 | Delano | July 23, 1935 |
| 2,205,523 | Galey | June 25, 1940 |
| 2,280,358 | Tietig | Apr. 21, 1942 |
| 2,327,918 | Miller | Aug. 24, 1943 |
| 2,374,034 | Nichols | Apr. 17, 1945 |
| 2,382,566 | Heckman | Aug. 14, 1945 |